(12) United States Patent
Zhu

(10) Patent No.: US 11,630,488 B2
(45) Date of Patent: Apr. 18, 2023

(54) DISPLAY MODULE AND BONDING METHOD THEREOF

(71) Applicant: WUHAN CHINA STAR OPTOELECTRONICS SEMICONDUCTOR DISPLAY TECHNOLOGY CO., LTD., Hubei (CN)

(72) Inventor: Cuilin Zhu, Hubei (CN)

(73) Assignee: WUHAN CHINA STAR OPTOELECTRONICS SEMICONDUCTOR DISPLAY TECHNOLOGY CO., LTD., Wuhan (CN)

(*) Notice: Subject to any disclaimer, the term of this patent is extended or adjusted under 35 U.S.C. 154(b) by 254 days.

(21) Appl. No.: 17/275,284

(22) PCT Filed: Dec. 30, 2020

(86) PCT No.: PCT/CN2020/141411
§ 371 (c)(1),
(2) Date: Mar. 11, 2021

(87) PCT Pub. No.: WO2022/141199
PCT Pub. Date: Jul. 7, 2022

(65) Prior Publication Data
US 2022/0206539 A1 Jun. 30, 2022

(30) Foreign Application Priority Data
Dec. 29, 2020 (CN) .......................... 202011597738.2

(51) Int. Cl.
*B32B 7/12* (2006.01)
*G06F 1/16* (2006.01)
(Continued)

(52) U.S. Cl.
CPC ............ *G06F 1/1656* (2013.01); *B29C 53/36* (2013.01); *B29C 65/48* (2013.01); *B29C 65/565* (2013.01);
(Continued)

(58) Field of Classification Search
CPC . B32B 7/12; B32B 3/04; G06F 1/1652; G06F 1/1656
See application file for complete search history.

(56) References Cited

U.S. PATENT DOCUMENTS 10,185,200 B1 1/2019 Sprague et al.

FOREIGN PATENT DOCUMENTS

CN 105118389 A 12/2015
CN 105446006 A 3/2016
(Continued)

*Primary Examiner* — Elizabeth E Mulvaney
(74) *Attorney, Agent, or Firm* — The Roy Gross Law Firm, LLC; Roy Gross

(57) ABSTRACT

A display module is disclosed. The display module includes a planar display area and a curved display area bending and extending from an edge of the planar display area. The display module includes a curved cover plate, a flexible display panel attached to the curved cover plate, and a backplate. The backplate includes a thinning part, and a thickness of the thinning part is gradually reduced from an edge area of the planar display area to the curved display area. The present disclosure can reduce forces undergone by the flexible display panel in the curved display area and prevent curved sides of the flexible display panel from having a cracking risk.

20 Claims, 4 Drawing Sheets

(51) Int. Cl.
    *B29C 53/36*     (2006.01)
    *B29C 65/48*     (2006.01)
    *B29C 65/56*     (2006.01)
    *B32B 3/04*     (2006.01)
    *B32B 3/26*     (2006.01)
    B29L 31/34     (2006.01)

(52) U.S. Cl.
    CPC ............... *B32B 3/04* (2013.01); *B32B 3/263* (2013.01); *B32B 7/12* (2013.01); *B29L 2031/3475* (2013.01); *B29L 2031/3481* (2013.01); *B32B 2457/20* (2013.01)

(56) References Cited

FOREIGN PATENT DOCUMENTS

| | | | | | |
|---|---|---|---|---|---|
| CN | 108735103 | A | | 11/2018 | |
| CN | 110021236 | A | | 7/2019 | |
| CN | 110212120 | A | | 9/2019 | |
| CN | 111106150 | A | | 5/2020 | |
| CN | 111554190 | A | | 8/2020 | |
| CN | 111554191 | A | | 8/2020 | |
| CN | 111584743 | A | | 8/2020 | |
| CN | 114495719 | A | * | 5/2022 | |
| CN | 115244600 | A | * | 10/2022 | |
| WO | WO-2020027437 | A1 | * | 2/2020 | ............... G02B 1/10 |

* cited by examiner

DISPLAY MODULE AND BONDING METHOD THEREOF

FIELD OF INVENTION

The present disclosure relates to the field of display technologies, and more particularly, to a display module and a bonding method thereof.

BACKGROUND OF INVENTION

In modern communication industry, a market demand for mobile phones, TVs, tablets, notebooks, and digital cameras is increasing, and various display devices are also developing toward full screens. In manufacture of flexible full-screen display modules, sided display designs are becoming a development trend of next-generation display products. A bending angle of current U-shaped bonded products is greater than 90 degrees. During the time and after display panels are bonded with U-shaped cover plates, bending positions of two long sides of the display panels are easy to crack due to undergoing excessive forces, thereby causing products to have dark lines when taking reliability tests.

Therefore, the current U-shaped bonded products have a risk of ease to have cracks and need to be improved.

Technical problem: an embodiment of the present disclosure provides a display module and a bonding method thereof to resolve technical problems of bending positions of flexible display panels in current display modules being easy to crack during the time or after U-shaped cover plates are bonded to the flexible display panels, which causes products to have dark lines when taking reliability tests.

SUMMARY OF INVENTION

To solve the above problems, an embodiment of the present disclosure provides technical solutions as follows.

An embodiment of the present disclosure provides a display module, which includes a planar display area and a curved display area bending and extending from an edge of the planar display area. The display module includes a curved cover plate, a flexible display panel attached to the curved cover plate, and a backplate. The backplate is disposed on one side of the flexible display panel away from the curved cover plate. Wherein, the backplate includes a thinning part, and a thickness of the thinning part is gradually reduced from an edge area of the planar display area to the curved display area. The backplate includes a main body part disposed in the planar display area, the main body part is connected to the thinning part, the thinning part extends into the curved display area from an edge of the main body part, and a variation of the thickness of the thinning part is a continuous change.

In an embodiment of the present disclosure, a junction of the thinning part and the main body part is located in the planar display area.

In an embodiment of the present disclosure, a vertical distance between the junction and the edge of the planar display area is less than a vertical distance between the junction and a center of the planar display area.

In an embodiment of the present disclosure, a minimum thickness of the thinning part ranges from ½ to ⅓ of a thickness of the main body part.

In an embodiment of the present disclosure, the variation of the thickness of the thinning part is a linear transformation.

In an embodiment of the present disclosure, the variation of the thickness of the thinning part is a nonlinear transformation.

An embodiment of the present disclosure further provides a display module, which includes a planar display area and a curved display area bending and extending from an edge of the planar display area. The display module includes a curved cover plate, a flexible display panel attached to the curved cover plate, and a backplate. The backplate is disposed on one side of the flexible display panel away from the curved cover plate. Wherein, the backplate includes a thinning part, and a thickness of the thinning part is gradually reduced from an edge area of the planar display area to the curved display area.

In an embodiment of the present disclosure, the backplate includes a main body part disposed in the planar display area, the main body part is connected to the thinning part, and the thinning part extends into the curved display area from an edge of the main body part.

In an embodiment of the present disclosure, a junction of the thinning part and the main body part is located in the planar display area.

In an embodiment of the present disclosure, a vertical distance between the junction and the edge of the planar display area is less than a vertical distance between the junction and a center of the planar display area.

In an embodiment of the present disclosure, a vertical distance from the junction to a corresponding edge of the planar display area is greater than 0 mm and less than 0.5 mm.

In an embodiment of the present disclosure, a minimum thickness of the thinning part ranges from ½ to ⅓ of a thickness of the main body part.

In an embodiment of the present disclosure, a variation of the thickness of the thinning part is a continuous change.

In an embodiment of the present disclosure, the variation of the thickness of the thinning part is a linear transformation.

In an embodiment of the present disclosure, the variation of the thickness of the thinning part is a nonlinear transformation.

In an embodiment of the present disclosure, an adhesive layer is attached between the curved cover plate and the flexible display panel, and a polarizer is disposed between the adhesive layer and the flexible display panel.

An embodiment of the present disclosure further provides a bonding method of a display module, which includes following steps:

S10: providing a curved cover plate, wherein the curved cover plate is defined with a planar display area and a curved display area bending and extending from an edge of the planar display area;

S20: providing a flexible display panel provided with a backplate on one side of the flexible display panel away from a light-emitting side of the flexible display panel, wherein the backplate includes a thinning part, and a thickness of the thinning part is gradually reduced from an edge area of the planar display area to the curved display area; and S30: bonding the light-emitting side of the flexible display panel to the curved cover plate.

In an embodiment of the present disclosure, the backplate includes a main body part disposed in the planar display area, the main body part is connected to the thinning part, and the thinning part extends into the curved display area from an edge of the main body part.

In an embodiment of the present disclosure, a variation of the thickness of the thinning part is a continuous change.

In an embodiment of the present disclosure, the variation of the thickness of the thinning part is a linear transformation.

Beneficial effect: a portion of the backplate, which extends from the edge area of the planar display area into the curved display area, is designed as a structure having a gradually reduced thickness, which can reduce forces undergone by the flexible display panel in the curved display area and prevent curved sides of the flexible display panel from having a cracking risk, thereby improving reliability and competitiveness of products.

DETAILED DESCRIPTION OF PREFERRED EMBODIMENTS

The present disclosure provides a display module and a bonding method thereof. In order to make the purpose, technical solutions, and effects of this disclosure clearer and more definite, the following further describes this disclosure in detail with reference to the drawings and embodiments. It should be understood that the specific embodiments described herein are only used to explain the disclosure, and are not used to limit the disclosure.

Figure 1:
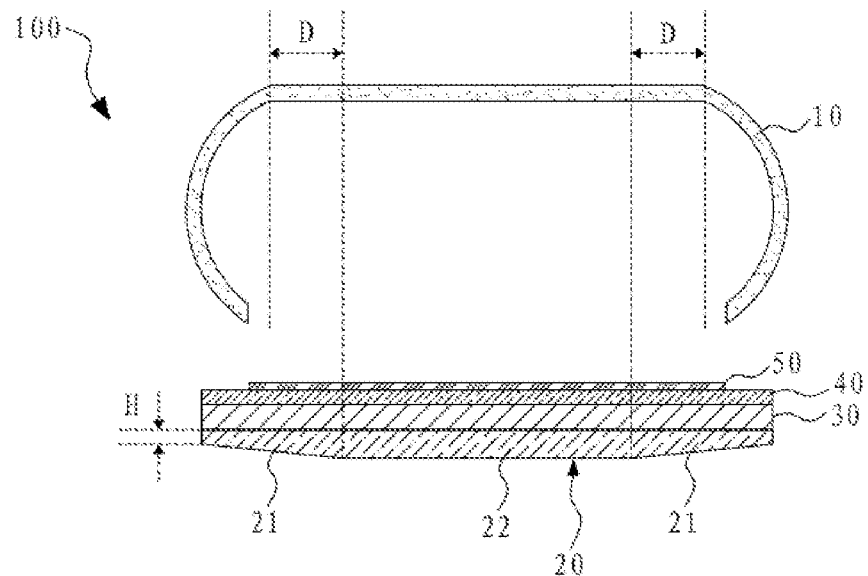
FIG. 1 is a schematic structural diagram of a display module before a flexible display panel and a curved cover plate is bonded according to an embodiment of the present disclosure.
Figure 2:
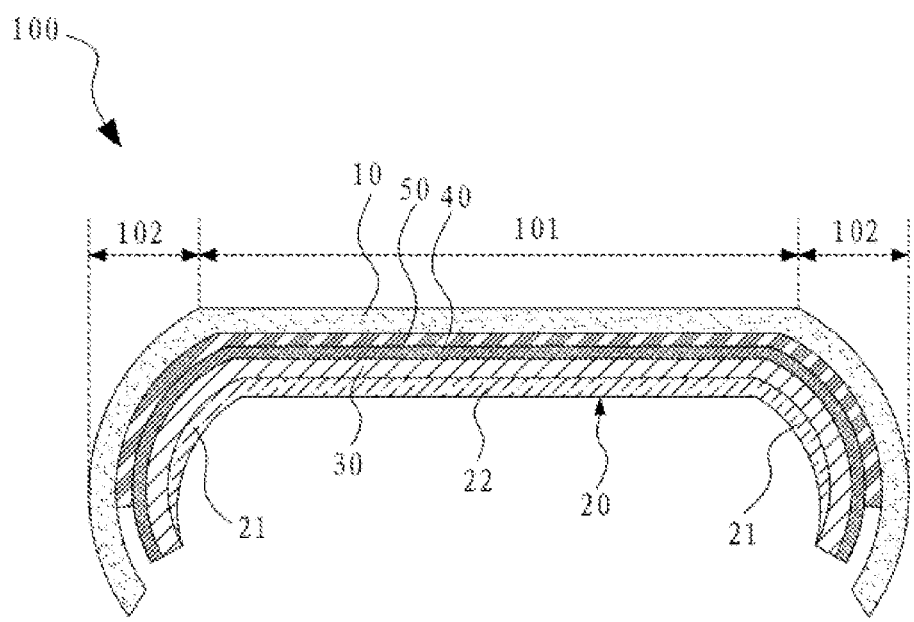
FIG. 2 is a schematic structural diagram of the display module after the flexible display panel and the curved cover plate is bonded according to an embodiment of the present disclosure.

Referring to FIGS. 1 and 2, FIG. 1 is a schematic structural diagram of a display module before a flexible display panel and a curved cover plate is bonded, and FIG. 2 is a schematic structural diagram of the display module after the flexible display panel and the curved cover plate is bonded according to an embodiment of the present disclosure. An embodiment of the present disclosure provides a display module 100. The display module 100 includes a planar display area 101 and a curved display area 102. The curved display area 102 is bent and extends from an edge of the planar display area 101.

The curved display area 102 is disposed on at least one side of the planar display area 101. The curved display area 102 in this embodiment can be disposed on two opposite sides of the planar display area 101, and specifically, can be disposed on two opposite long sides of the planar display area 101. The planar display area 101 and the curved display area 102 form a U-shaped display area together.

The display module 100 includes a curved cover plate 10, a flexible display panel 30, and a backplate 20. The flexible display panel 30 is attached to the curved cover plate 10, and the backplate 20 is disposed on one side of the flexible display panel 30 away from the curved cover plate 10 and has support and protection effects.

When the curved cover plate 10 is attached to the flexible display panel 30, since an edge part of the flexible display panel 30 needs to be bent into a same arc shape as the curved cover plate 10, a part to be bent of the flexible display panel 30 will undergo a larger stress and is easy to have cracks, thereby causing products to have dark lines when taking reliability tests. The embodiment of the present disclosure can reduce stresses undergone by the flexible display panel 30 in the curved display area 102 by thinning a partial thickness of the backplate 20 corresponding to the curved display area 102.

In general, before bonding the flexible display panel 30 to the curved cover plate 10, a polarizer and structures such as heat dissipation materials are attached to the flexible display panel 30. After bonding the flexible display panel 30 to the curved cover plate 10, wirings of the flexible display panel 30 in the curved display area 102 are on a neutral layer and undergo tensile stresses. Therefore, thinning the partial thickness of the backplate 20 corresponding to the curved display area 102 can make the neutral layer move up, thereby allowing the wirings of the flexible display panel 30 to be closer to the neutral layer, thereby reducing the tensile stresses of the wirings and reducing a risk of cracking.

Specifically, the backplate 20 includes a thinning part 21, and a thickness of the thinning part 21 is gradually reduced from an edge area of the planar display area 101 to the curved display area 102.

Specifically, the thinning part 21 may extend along a direction of the two opposite long sides of the planar display area 101. The thinning part 21 is flush with the long sides of the planar display area 101, and the backplate 20 is thinned from a position of the two long sides of the planar display area 101 to the curved display area 102, thereby reducing a risk of cracking on the long sides which need to be bent and improving reliability and competitiveness of products.

In an embodiment, the thickness of the thinning part 21 is gradually reduced from the planar display area 101, that is, the thickness of the backplate 20 may be thinned from the planar display area 101.

The backplate 20 also includes a main body part 22 disposed in the planar display area 101. A thickness of the main body part 22 is unchanged, that is, the thickness of the main body part 22 is greater than any thickness of the thinning part 21.

The main body part 22 is connected to the thinning part 21, and the thinning part 21 extends into the curved display area 102 from an edge of the main body part 22. A first thickness H of the thinning part 21 ranges from ½ to ⅓ of the thickness of the main body part 22, and the first thickness H is referred to a thickness of one end of the thinning part 21 away from the main body part 22. That is, a minimum thickness of the thinning part 21 ranges from ½ to ⅓ of the thickness of the main body part 22. A range of thinned thickness of the backplate 20 should be considered to meet requirements of reducing the stresses of the wirings, meanwhile allowing the backplate 20 to have no wrinkles when attached, and conveniences of cutting and processing. In other embodiments, the first thickness H may be adjusted according to practical products.

Compared to performing a uniform thinned thickness design on the thinning part 21, the thinning part 21 having a gradually thinned design has an advantage of a stronger support for the curved display area 102.

In an embodiment, the backplate 20 is thinned from the planar display area 101. Specifically, a junction of the thinning part 21 and the main body part 22 is located in the planar display area 101.

Preferably, the thinning part 21 is adjacent to the edge of the planar display area 101, that is, a vertical distance between the junction and the edge of the planar display area 101 is less than a vertical distance between the junction and a center of the planar display area 101.

When considering attaching accuracy and cutting accuracy of bonding equipments, a vertical distance D from the junction of the thinning part 21 and the main body part 22 to a corresponding edge of the planar display area 101 may be designed greater than 0 mm and less than 0.5 mm. That is, a horizontal vertical distance between a starting thinned position of the backplate 20 and a starting bent position of the curved cover plate 10 is greater than 0 mm and less than 0.5 mm.

The planar display area 101 corresponds to a planar part of the curved cover plate 10, and the curved display area 102 corresponds to a curved part of the curved cover plate 10.

An adhesive layer 50 is further attached between the curved cover plate 10 and the flexible display panel 30. The adhesive layer 50 may be an optical adhesive layer and is configured to bond the curved cover plate 10 and the flexible display panel 30.

A polarizer 40 is disposed between the adhesive layer 50 and the flexible display panel 30 and is configured to improve a contrast ratio of the display module 100 under a strong light environment.

One side of the backplate 20 away from the flexible display panel 30 is further provided with a heat dissipation substrate to dissipate heat of the display module 100.

Compared to current technology, disposing the thinning part 21 having a gradually thinned thickness allows the flexible display panel 30 in the curved display area 102 to be closer to the neutral layer in film layers of the display module 100. Since the film layers at the neutral layer will not undergo tensile stresses nor compressive stresses and a length of the neutral layer during bending is same as before bending, the film layers adjacent to the neutral layer will undergo relatively small stresses.

In an embodiment, referring to FIG. 1, when the flexible display panel is in a planar state, one side surface of the thinning part 21 adjacent to the flexible display panel 30 is flush with one side surface of the main body part 22 adjacent to the flexible display panel 30, and another side surface of the thinning part 21 away from the flexible display panel 30 is an inclined surface.

A variation of the thickness of the thinning part 21 is a continuous change. In an embodiment, the variation of the thickness of the thinning part 21 may be a linear transformation. For example, the another side surface of the thinning part 21 away from the flexible display panel 30 may be a flat inclined surface. In other embodiments, the variation of the thickness of the thinning part 21 may be a nonlinear transformation. For example, the another side surface of the thinning part 21 away from the flexible display panel 30 may be an arc inclined surface. Compared to the arc inclined surface, the flat inclined surface is easier to achieve in process, but the arc inclined surface will undergo relatively small stresses when bending. The two inclined surfaces have their own advantages, and in this embodiment of the present disclosure, the flat inclined surface is preferred.

Figure 3:
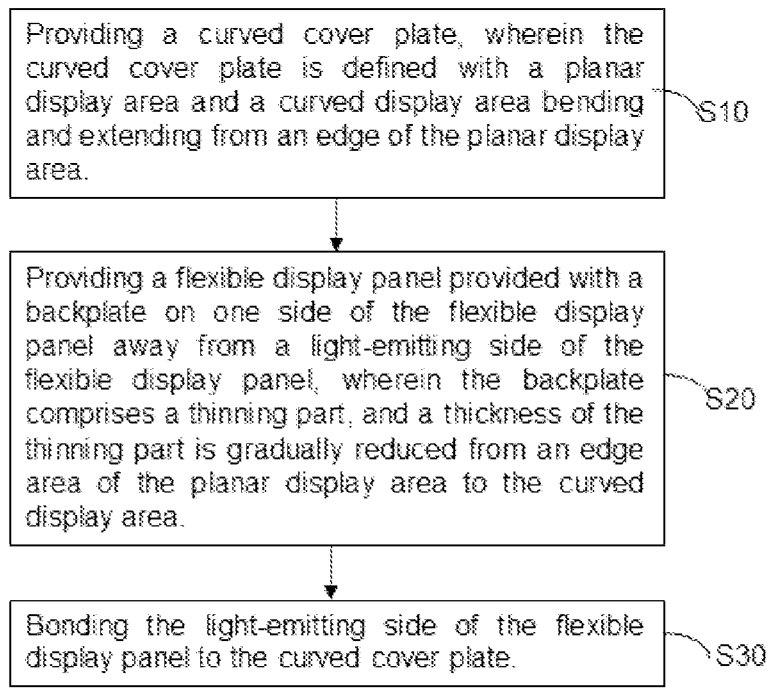
FIG. 3 is a flowchart of a bonding method of the display module according to an embodiment of the present disclosure.

Referring to FIGS. 3 and 1, based on a structure of the display module 100 above, an embodiment of the present disclosure further provides a manufacturing method of the display module 100, which includes following steps.

Step S10: providing the curved cover plate 10, wherein the curved cover plate 10 is defined with the planar display area 101 and the curved display area 102 bending and extending from the edge of the planar display area 101.

Step S20: providing the flexible display panel 30 provided with the backplate 20 on one side of the flexible display panel 30 away from a light-emitting side of the flexible display panel 30, wherein the backplate 20 includes the thinning part 21, and the thickness of the thinning part 21 is gradually reduced from the edge area of the planar display area 101 to the curved display area 102.

Step S30: bonding the light-emitting side of the flexible display panel 30 to the curved cover plate 10.

A process to bond the curved cover plate 10 and the flexible display panel can be divided into two steps, which includes bonding to the planar display area first and then bonding to the curved display area.

Referring to FIGS. 4A to 4D, first, the curved cover plate 10 which is integrally formed is disposed on a corresponding material stand, and the flexible display panel 30 is disposed on a support stand 60 having a boss 61. In FIGS. 4A to 4D, only the flexible display panel 30 is shown, other film layers stacked with the flexible display panel 30 are omitted in the figures.

Specifically, an alignment film 80 is disposed between the flexible display panel 30 and the boss 61, two ends of the alignment film 80 are clamped by clamps 70, and a bending angle of the alignment film 80 is adjusted by adjusting a clamped angle of the clamps 70, thereby guiding the flexible display panel 30 to bend.

Figure 4A:
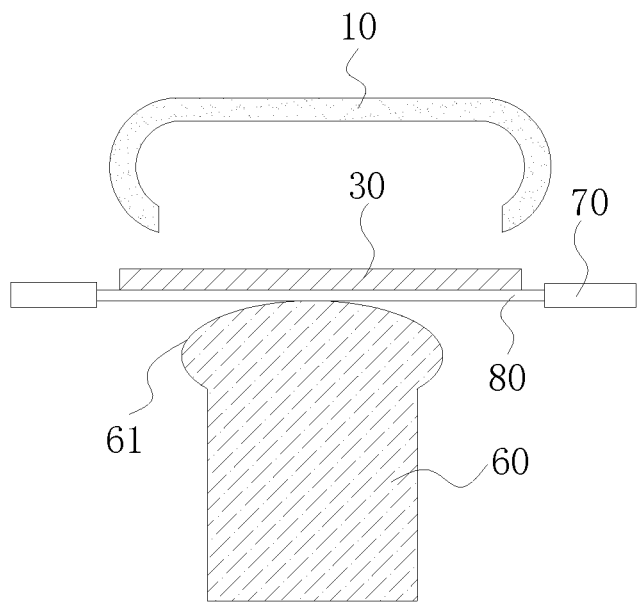
FIGS. 4A to 4D are schematic structural diagrams of a bonding process of bonding the flexible display panel to the curved cover plate according to an embodiment of the present disclosure.

Referring to FIG. 4A, the flexible display panel 30 and the alignment film 80 in a planar state are disposed on a surface of the boss 61. After aligning using a CCD camera and peeling an adhesive layer on the flexible display panel 30 off, the flexible display panel 30 is pre-bent.

Figure 4B:
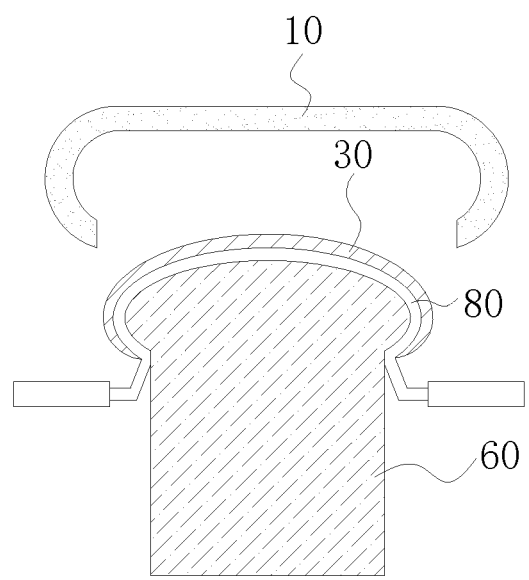

Referring to FIG. 4B, specifically, the flexible display panel 30 is bent to have a same shape as the boss 61 by changing a direction of a chuck of the clamps 70.

Figure 4C:
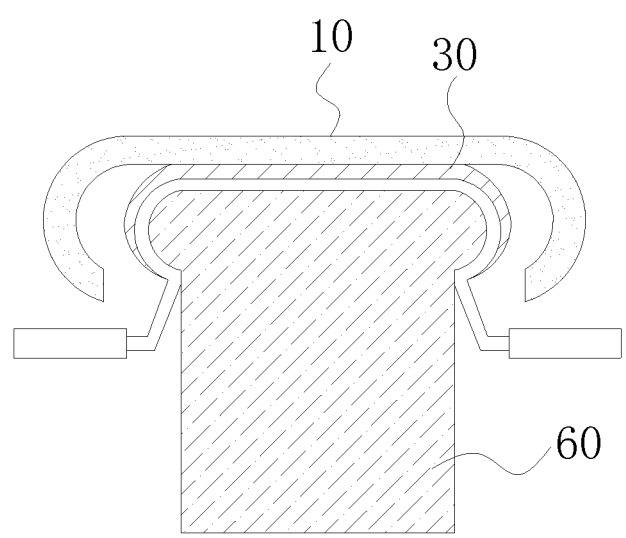

Referring to FIG. 4C, wherein afterwards, bonding to the planar display area is carried out. Specifically, the support stand 60 moves in a vertical direction to allow the flexible display panel 30 to be attached to the planar display area of the curved cover plate 10.

Figure 4D:
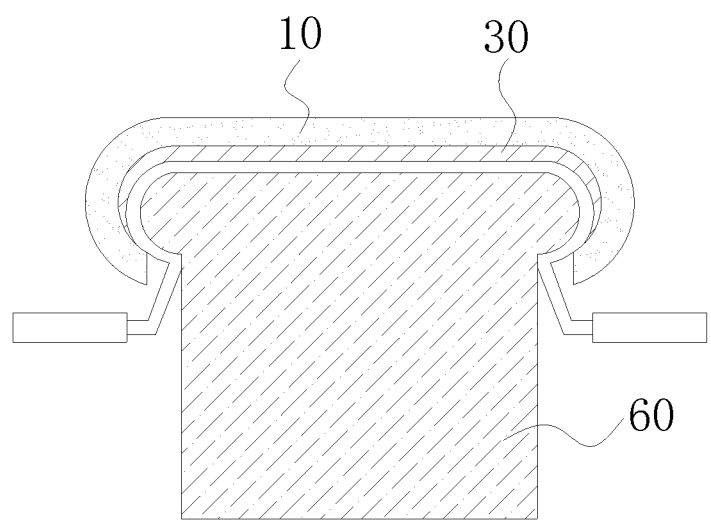

Referring to FIG. 4D, wherein bonding to the curved display area is then carried out. Specifically, the alignment film 80 is stretched by the clamps, allowing the alignment film 80 to move toward the curved display area, which drives the flexible display panel 30 to approach the curved display area of the curved cover plate 10 and allows the flexible display panel 30 to be attached to the curved display area of the curved cover plate 10.

Components such as a polarizer and a touch layer may be further attached between the curved cover plate 10 and the flexible display panel 30, and when bonding, these components have a same bending shape and a same bending angle as the flexible display panel 30.

One side of the backplate 20 away from the flexible display panel 30 is further provided with a heat dissipation substrate to dissipate heat of the display module 100.

During bonding to the curved display area, in order to ensure the backplate 20 having no wrinkles when attaching, the first thickness H of the thinning part 21 of the backplate 20 in this embodiment ranges from ½ to ⅓ of the thickness of the main body part 22. The first thickness H is referred to the thickness of one end of the thinning part 21 away from the main body part 22. That is, the minimum thickness of the thinning part 21 ranges from ½ to ⅓ of the thickness of the main body part 22. In other embodiments, the first thickness H may be adjusted according to practical products.

The thinning part 21 may be designed on the two opposite long sides of the planar display area 101. The backplate 20 is thinned from the position of the two long sides of the planar display area 101 to the curved display area 102, thereby reducing the risk of cracking on the long sides which need to be bent and improving the reliability and competitiveness of products.

In this embodiment, considering convenience of processes, the thinning part 21 may be the flat inclined surface having a gradually reduced thickness. In other embodiments, the thinning part 21 may also be the arc inclined surface having a gradually reduced thickness, and compared to the flat inclined surface, the arc inclined surface is more beneficial for bending when bending.

A portion of the backplate 20, which extends from the edge area of the planar display area 101 into the curved display area 102, is designed as a structure having a gradually reduced thickness, which can reduce forces undergone by the flexible display panel 30 in the curved display area 102 and prevent curved sides of the flexible display panel 30 from having a cracking risk, thereby improving the reliability and competitiveness of products.

In the above embodiments, the description of each embodiment has its own emphasis. For a part that is not described in detail in an embodiment, refer to the related descriptions of other embodiments.

The display module and the bonding method thereof provided by the embodiments of the present disclosure are described in detail above. The specific examples are applied in the description to explain the principle and implementation of the disclosure. The description of the above embodiments is only for helping to understand the technical solution of the present disclosure and its core ideas, and it is understood that many changes and modifications to the described embodiment can be carried out without departing from the scope and the spirit of the disclosure that is intended to be limited only by the appended claims.

What is claimed is:

1. A display module, comprising a planar display area and a curved display area bending and extending from an edge of the planar display area, wherein the display module comprises:
   a curved cover plate;
   a flexible display panel attached to the curved cover plate; and
   a backplate disposed on one side of the flexible display panel away from the curved cover plate;
   wherein the backplate comprises a thinning part, and a thickness of the thinning part is gradually reduced from an edge area of the planar display area to the curved display area; and
   the backplate comprises a main body part disposed in the planar display area, the main body part is connected to the thinning part, the thinning part extends into the curved display area from an edge of the main body part, and a variation of the thickness of the thinning part is a continuous change.

2. The display module according to claim 1, wherein a junction of the thinning part and the main body part is located in the planar display area.

3. The display module according to claim 2, wherein a vertical distance between the junction and the edge of the planar display area is less than a vertical distance between the junction and a center of the planar display area.

4. The display module according to claim 2, wherein a minimum thickness of the thinning part ranges from ½ to ⅓ of a thickness of the main body part.

5. The display module according to claim 1, wherein the variation of the thickness of the thinning part is a linear transformation.

6. The display module according to claim 1, wherein the variation of the thickness of the thinning part is a nonlinear transformation.

7. A display module, comprising a planar display area and a curved display area bending and extending from an edge of the planar display area, wherein the display module comprises:
   a curved cover plate;
   a flexible display panel attached to the curved cover plate; and
   a backplate disposed on one side of the flexible display panel away from the curved cover plate;
   wherein the backplate comprises a thinning part, and a thickness of the thinning part is gradually reduced from an edge area of the planar display area to the curved display area.

8. The display module according to claim 7, wherein the backplate comprises a main body part disposed in the planar display area, the main body part is connected to the thinning part, and the thinning part extends into the curved display area from an edge of the main body part.

9. The display module according to claim 8, wherein a junction of the thinning part and the main body part is located in the planar display area.

10. The display module according to claim 9, wherein a vertical distance between the junction and the edge of the planar display area is less than a vertical distance between the junction and a center of the planar display area.

11. The display module according to claim 10, wherein a vertical distance from the junction to a corresponding edge of the planar display area is greater than 0 mm and less than 0.5 mm.

12. The display module according to claim 9, wherein a minimum thickness of the thinning part ranges from ½ to ⅓ of a thickness of the main body part.

13. The display module according to claim 7, wherein a variation of the thickness of the thinning part is a continuous change.

14. The display module according to claim 13, wherein the variation of the thickness of the thinning part is a linear transformation.

15. The display module according to claim 13, wherein the variation of the thickness of the thinning part is a nonlinear transformation.

16. The display module according to claim 7, wherein an adhesive layer is attached between the curved cover plate and the flexible display panel, and a polarizer is disposed between the adhesive layer and the flexible display panel.

17. A bonding method of a display module, comprising following steps:
   S10: providing a curved cover plate, wherein the curved cover plate is defined with a planar display area and a curved display area bending and extending from an edge of the planar display area;
   S20: providing a flexible display panel provided with a backplate on one side of the flexible display panel away from a light-emitting side of the flexible display panel, wherein the backplate comprises a thinning part, and a thickness of the thinning part is gradually reduced from an edge area of the planar display area to the curved display area; and
   S30: bonding the light-emitting side of the flexible display panel to the curved cover plate.

18. The bonding method of the display module according to claim 17, wherein the backplate comprises a main body part disposed in the planar display area, the main body part is connected to the thinning part, and the thinning part extends into the curved display area from an edge of the main body part.

19. The bonding method of the display module according to claim 17, wherein a variation of the thickness of the thinning part is a continuous change.

20. The bonding method of the display module according to claim 19, wherein the variation of the thickness of the thinning part is a linear transformation.

\* \* \* \* \*